Oct. 19, 1943.  W. H. WAKEFIELD  2,332,360
DIE AND METHOD OF MAKING SAME
Filed Feb. 9, 1943
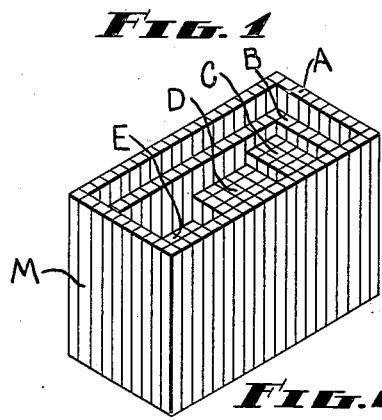
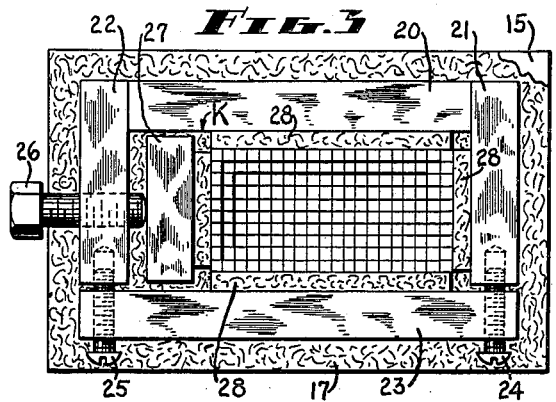
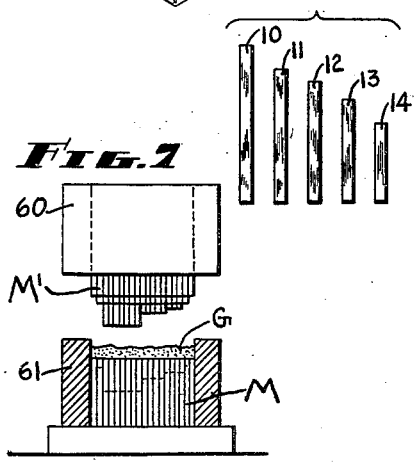
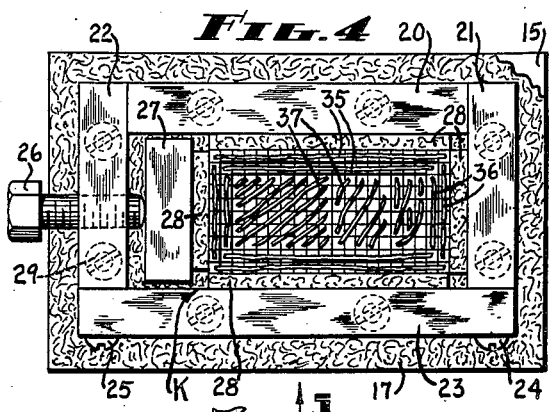
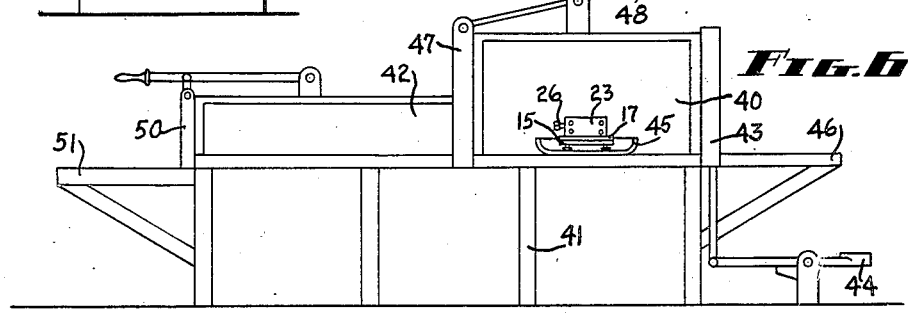
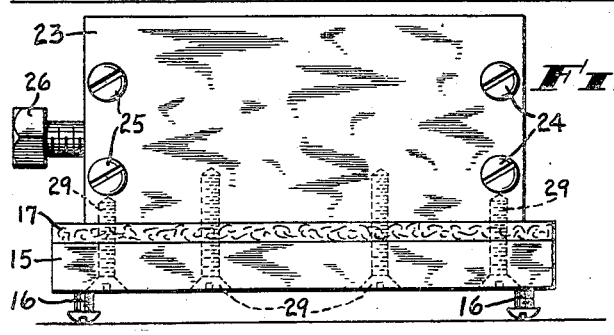
INVENTOR
WALTER H. WAKEFIELD
ATTORNEY Patented Oct. 19, 1943

2,332,360

UNITED STATES PATENT OFFICE 2,332,360

DIE AND METHOD OF MAKING SAME

Walter H. Wakefield, Worcester, Mass., assignor to Crompton & Knowles Loom Works, Worcester, Mass., a corporation of Massachusetts Application February 9, 1943, Serial No. 475,258

15 Claims. (Cl. 76—107)

This invention relates to improvements in dies and the method of their manufacture and it is the general object of the invention to provide a die built up of a number of rod units of different lengths united to form a block or the like and having the required contour.

Heretofore it has been customary to form dies by cutting the desired contour out of a solid block of metal. The usual procedure is to use a milling machine to which is clamped a pattern and the die blank and having a pattern reader and a rotary cutter. The pattern and blank are moved together vertically and horizontally and the reader is stopped in its downward motion by the pattern to determine the depth of cut made by the rotary cutter. The cutter is then raised and the reader moved to a new part of the pattern for the next cut. This operation is repeated for the entire contoured surface but is slow and involves high labor costs.

It is an important object of my present invention to provide a number of rod units or bars of different lengths prepared on a mass production basis and assembled in a holder according to a predetermined pattern. The rod units are then united by a welding or brazing operation to form the die. The various steps in the operation can be performed by unskilled labor without the use of expensive machinery, and the labor cost of the finished product is low.

In order that the surfaces of the rods may be in close contact with each other during the brazing operation I preferably use bars of square or rectangular and uniform cross section. The various rods are first assembled loosely in a clamp or jig according to the desired pattern and are then compared with the latter to correct any mistakes which may have been made in the selection or placing of the rods, after which the clamp or jig is tightened to force the adjacent surfaces of the rods or bars into close contact with each other. In one method of carrying out my invention copper powder or wire is placed over the tops of the rods and the jig is then placed in a furnace to melt the copper and cause it to flow down along the surfaces of the rods. By forcing the surfaces of the rods against each other in the jig they are not only held together frictionally in proper position, but creeping of the molten copper along the surfaces by capillary attraction is facilitated. The brazing metal has a higher coefficient of expansion than the steel rods, hence in the cooling of the die the rods are not spread apart but are drawn closely together. This is true whether the brazing metal be copper or silver.

In the brazing operation the copper joins the various rods and would also join them to the jig or holder unless provisions were made to prevent this joining in those instances where the die is to be separated from the holding jig. To prevent brazing of the die to its jig the latter can be lined with hard pressed asbestos plates or with a metal to which the copper does not readily adhere, such as an alloy of nickel and chromium known in the trade as "nichrome."

With these and other objects in view which will appear as the description proceeds, my invention resides in the combination and arrangement of parts hereinafter described and set forth.

In the accompanying drawing, wherein a convenient embodiment of my invention is set forth, Fig. 1 is a perspective view of a die made according to my present invention, Fig. 2 is a group view showing the die forming rod units of different lengths, Fig. 3 is a plan view of a jig or holder containing the loosely assembled rods, Fig. 4 is a view similar to Fig. 3 but showing the rods clamped tightly in position and provided with copper wire preparatory to the brazing operation, Fig. 5 is a side view of the rod unit holder looking in the direction of arrow 5, Fig. 4.

Fig. 6 is a diagrammatic view showing the furnace in which the die may be solidified, and Fig. 7 shows one manner of using the die made according to my invention.

The die will ordinarily be made in two parts both of which are preferably made according to my invention. The drawing shows in detail the lower part only, designated generally at M, but the upper part M', Fig. 7, will be similar to the lower part. Referring to Fig. 1, the die M has a flat top surface A and other lower surfaces at different levels designated at B, C, D and E. As shown in Fig. 1 these various surfaces are all flat and horizontal, the upper surfaces A and B extending around their respective parts of the die while the lower three surfaces are stepped.

In making the die as shown in Fig. 1 I provide a variety of rods or die forming units of different lengths but preferably all of the same cross section. As shown in Fig. 2, for instance, I have indicated five rods 10, 11, 12, 13 and 14 all of different lengths. There will be several rods of each length, the number being determined by the pattern. It is to be understood that these rods are cut from longer rods and if desired assembled in groups according to length. These rods are then assembled in a jig or holder in which they can be arranged according to the desired pattern.

In Fig. 3 I show a convenient form of jig comprising a base 15 supported on feet 16 and over which lies a plate 17 of hard pressed asbestos board. Above the latter is a side bar 20 to which are secured end cross heads 21 and 22. A second side bar 23 is held by screws 24 and 25 to the cross heads 21 and 22, respectively, and is capable of movement toward and from the bar 20. A screw 26 is threaded into the cross head 22 for the purpose of forcing a pressure block 27 toward the cross head 21. The pressure block and cross head 21 together with adjacent parts of the bars 20 and 23, provide an open space or compartment the sides of which may be lined by plates 28 made of a heat resisting material similar to plate 17. Screws 29 pass upwardly through base 15 and into the side bars and cross heads to draw them down on plate 17. There is thus provided a compartment K lined on its bottom and sides with heat resisting plates.

With the screws 24 and 25 loose to permit bar 23 to be spaced slightly from the cross head, and the pressure screw 26 loose to permit the pressure block 27 to be located far enough from cross head 21 to permit assembly of the various rods, the latter are inserted into the compartment K. In the assembling operation I find it desirable to hold the jig inclined so that the rods will hold their position by gravity. When placed as indicated in Fig. 3 the lower ends of all the rods will rest on the plate 17 and the upper ends of the rods terminate at different levels depending upon their length to provide the desired contour.

After the loosely assembled rods are compared with the pattern to make sure that all the rods are in proper position, the screws 24 and 25 are tightened to exert a transverse force on the several rods, and the screw 26 is also tightened to force the pressure block 27 toward the group of rods. This tightening operation can be carried on in steps so that the pressure is built up both transversely and longitudinally of the jig in such a way as to permit the various rods to adjust themselves properly and move into close mutual contact in response to the pressures exerted on them. At some intermediate step in the tightening of the assembled group it may be desirable to tap them lightly on their upper ends to be sure that each rod is properly seated on the plate 17.

After the tightening operation is completed copper wires cut to the proper lengths are laid along the surfaces A—E. As shown for instance in Fig. 4 the long copper wires 35 extend along the long parts of the surfaces A and B while cross copper wires 36 are provided for the end sections of these areas. Other copper wires designated generally at 37 are laid along the surfaces C, D and E and all of the copper wires may be held in place by a clear shellac which prevents dislodgement of them without interfering in any way with the subsequent heating operation.

As setting forth a convenient form of furnace in which the welding or brazing operation may be carried out I show a heating compartment 40 in Fig. 6 supported by a base 41 and communicating with a cooling chamber 42. A door 43 for the front end of the furnace may be lifted by a treadle 44 so that a basket 45 containing the jig may be moved from a feeding platform 46 into the interior of the heating chamber. A rear door 47 controlled by the lever 48 is preferably closed at this time and the basket is inserted into the furnace as quickly as possible to prevent ingress of air through the open door. The reason for this last precaution is to eliminate oxygen so that the brazing operation may be carried out in a non-oxidizing atmosphere.

During the heating operation the copper wires melt and seep down between adjacent surfaces of the rods 10 to 14 and are held between the rods when in the molten state by capillary attraction. The shellac completely disappears and has no harmful effect on the brazing or welding operation. After enough time has lapsed for the molten copper to penetrate the spaces between the several rods the front and rear doors 43 and 47 are opened and the basket 45 pushed into the cooling chamber 42 by means of a tong introduced through door 43. When in the cooling chamber the temperature of the jig and die drops uniformly to a temperature which permits its handling, after which the discharge door 50 of the cooling chamber is raised and the basket is moved on to a receiving platform 51.

I find that the asbestos lining of the compartment K will crack if there is any unequal distribution of pressure on the plates 17 and 28, and if it is desirable to eliminate the asbestos plates they may be replaced by plates formed of an alloy to which the molten copper will not adhere, such as an alloy of nickel and chromium. Inasmuch as the brazing operation is carried on in a non-oxidizing furnace, I find that the screws 24, 25 and 26 can be turned after the heating operation so that the jig can be used repeatedly.

While I have mentioned copper wire I do not wish necessarily so to be limited, since I have found that powdered pure copper will provide an equally effective bond for the various rod units. The basket 45 is preferably made of wires of nickel and chromium alloy so that any molten copper which may flow over the jig will not hold the latter tightly to the basket.

The die M already described may be used in connection with a second die M', shown in Fig. 7. The die M' is made in a manner similar to that described for die M except that the various rods will project below an inclosing frame 60. In making the die M' the plates 17 and 28 will be omitted so that the several rod units will be fastened not only to themselves but also to the frame 60. The die M is placed in a box 61 which fits it snugly and projects above it sufficiently to inclose the material G to be shaped. Material G may be metal or a sheet of plastic composition. If plastic is used the box 61 and die M are heated sufficiently to soften it, but if metal is used this heating step is omitted. If a phenol condensation product is used it will be in the form of a powder placed over die M in the box 61. By appropriate means the die M' is then inserted into the box 61 under pressure against the material G. If the latter be a phenol condensation product heat will be applied to the die sufficiently to convert the powder into a plastic mass which will follow the contours of the dies. After the pressing operation is completed die M' is lifted out of box 61 and the work and die M then removed from box 61. The manner of using my improved dies as shown in Fig. 7 is given for illustrative purposes only and I do not wish to be thus limited in the practice of my invention.

The cutting operation by which the rods 10 to 14 are produced may result in the accumulation of grit which is preferably removed by a washing operation before assembly into compartment K. Furthermore, the longer rods from which the shorter rods are cut are likely to be coated with oil or grease to prevent rusting and when this is the case a degreasing operation is desirable. I have found that carbon tetra-chloride can be used satisfactorily for cleaning the rods and also removing grease. Although I have described copper as the bonding metal the method set forth herein can be carried out with the use of silver, in which case the rods must be degreased and then coated with a flux either before or after being placed loosely in the compartment K. Silver melts at a considerably lower temperature than does copper and for certain purposes is the preferable metal to use.

As a specific instance of one way in which I have carried my invention into effect, the rods are $\frac{3}{32}$" square with a carbon content of S. A. E. 1095. The copper wire is size #14 and the temperature of the brazing compartment is approximately 2100° F. The hard pressed asbestos plates 17 and 28, when used, are about $\frac{3}{16}$" thick and the base 15, side bars 20 and 23, cross heads 21 and 22, and pressure plate 27 may be made of S. A. E. 1045 steel. The brazing operation in the furnace requires about twenty minutes when copper is used. The rods are cut by a thin carborundum wheel which runs at about 7500 peripheral feet per minute and produces smooth square ends on the rod units.

From the foregoing it will be seen that I have provided an improved method for making a die of a large number of small parts assembled according to their length to provide a desired pattern and then solidified or integrated to form a solid mass. By following the method set forth hereinbefore only that amount of metal is used which is actually required to form the die and there is no waste metal such as attends the production of dies according to former practice. Furthermore, it is found that the integration by copper or other metal provides a very strong die which has a strength comparable to dies cut out of solid blanks. Again, it is to be noted that all the operations can be performed with unskilled labor and that the cutting of the units of different lengths can be a mass production operation so that the actual contouring of the die can be effected cheaply. The ends of the various units are cut off square in the form of the invention set forth herein and since they are produced by the same manufacturing process all the units of a given type will be the same length so that when grouped together they present a substantially flat surface. Also, it will be noted that the pressure described in connection with Fig. 4 not only produces a group the dimensions of which are aliquot multiples of the dimensions of the individual unit, but the close contact attained in the pressing operation facilitates flowing of the bonding metal along all of the surfaces by capillary attraction so that all of the rods are united. Furthermore, since copper and silver have higher coefficients of expansion than steel, they have no effect tending to spread the units during cooling, but rather act to draw them together. Where desired the exposed surfaces of the unitary die may be surface ground, but this is found not to be an essential step.

Having thus described my invention it will be seen that changes and modifications may be made therein by those skilled in the art without departing from the spirit and scope of the invention and I do not wish to be limited to the details herein disclosed, but what I claim is:

1. The method of forming a die from a plurality of straight rods, the method consisting in the following steps: arranging the rods in a group with the upper ends thereof at different levels to provide the upper surface of the group with a patterned contour, exerting lateral force on the group of rods to force the latter into close contact with each other, causing a molten brazing metal which melts at a temperature below the melting temperature of the rods to flow between said rods while said lateral force is being exerted on the rods, and subsequently cooling the group of rods and brazing metal while said force is exerted on the rods to cause the brazing metal to unit the rods into a solid block.

2. The method of forming a die from a plurality of straight rods consisting in the following steps: arranging the rods in a group with their upper ends at different levels to provide the top surface of the group with a patterned contour, exerting lateral forces on said group of rods to force the latter into close contact with each other, placing on the upper ends of said rods a brazing metal which melts at a temperature lower than the melting temperature of the rods, heating the group of rods and brazing metal sufficiently to melt the brazing metal without melting the rods, whereupon the molten brazing metal flows down between said rods while said forces are exerted on the rods, and subsequently lowering the temperature at which the brazing metal solidifies while said forces are still exerted on the group of rods to cause said brazing metal to unite the rods into a solid block.

3. The method of forming a die from a plurality of straight steel rods consisting in the following steps: arranging the rods in close parallel relationship in a group with their upper ends at different levels to provide the top surface of the group with a patterned contour, placing copper over the tops of the rods, subjecting the rods and copper to a temperature sufficiently high to melt the copper but insufficiently high to melt the rods to cause the copper to flow down between the rods, and subsequently cooling the rods and copper to cause the latter to unite the rods into a solid block.

4. The method of forming a die from a plurality of straight metallic rods consisting in the following steps: providing a container having metallic sides, assembling the rods in a group in the container with their upper ends at different levels to give the surface of the group a patterned contour, forcing the sides of the container against the rods to hold the latter in close contact with each other and the container, brazing the rods to each other and to the sides of the container by a metal which melts at a temperature not sufficiently high to melt the rods or said sides, and subsequently cooling said sides, rods, and brazing metal to cause the latter to hold the rods and sides together as a unified structure.

5. The method of forming a die from a plurality of straight metallic rods consisting in the following steps: providing a container having metallic sides, assembling the rods in a group in the container with their upper ends extending above the level of the tops of said sides and at different levels to give the upper surface of the group a patterned contour located above said sides, forcing the sides of the container against the rods to hold the latter in close contact with each other and the container, brazing the rods to each other and to the sides of the container by a metal which melts at a temperature not sufficiently high to melt the rods or said sides, and subsequently cooling said sides, rods, and brazing metal to cause the latter to hold the rods and sides together as a unified structure.

6. The method of forming a die from a plurality of straight rods consisting in the following steps: arranging the rods in a group with their upper ends at different levels to provide the top surface of the group with a patterned contour, exerting lateral forces on the rods to hold adjacent faces thereof sufficiently close to each other to cause a given brazing metal when molten to creep along said adjacent surfaces by capillary attraction, placing the given brazing metal over the tops of the rods, the brazing metal melting at a temperature lower than the melting temperature of the rods, heating the rods and brazing metal sufficiently to melt the brazing metal without melting the rods to cause the molten metal by capillary attraction to fill the spaces between the rods while said lateral forces are being exerted on the rods, and subsequently cooling the rods and brazing metal while said forces are being exerted as aforesaid to cause solidification of the brazing metal and cause the latter to hold said rods together to form a solid block.

7. The method of forming a die from a plurality of straight rods consisting in the following steps: arranging the rods in a group with their upper ends at different levels to provide said group with a patterned contour, exerting lateral forces on said rods to force the latter into close contact with each other, brazing the rods together while said lateral forces are exerted thereon by a metal which has a coefficient of expansion greater than the coefficient of expansion of the rods and melts at a temperature lower than the melting temperature of said rods, and subsequently cooling said rods and brazing metal while said lateral forces are still exerted on said rods to solidify the brazing metal and cause it to hold the rods together in a solid block and draw said rods together as the temperature of said block falls.

8. The method of forming a die from a plurality of metallic rods of different lengths and of uniform rectangular cross section, the method consisting in the following steps: assembling the rods in a group in close mutual engagement with each other with their lower ends in a plane and with their upper ends at different levels to provide the upper surface of the group with a patterned contour, causing a molten brazing metal which will adhere to the rods and melts at a temperature below the melting temperature of the rods to flow between the rods while the latter are heated to a temperature which melts the brazing metal, and subsequently cooling the group of rods and the brazing metal while the rods are in said close mutual engagement with each other to cause the brazing metal to solidify and unite the rods into a solid block.

9. The method of forming a die from a plurality of metallic rods of different lengths, the method consisting in the following steps: assembling the rods in a group in close mutual engagement with each other with their lower ends in a plane and with their upper ends at different levels to provide the upper surface of the group with a patterned contour, placing over the upper ends of the rods a brazing metal which melts at a temperature below the melting temperature of the rods, heating the group of rods and brazing metal sufficiently to melt the latter without melting the rods and thereby cause the molten brazing metal to flow downwardly between said rods, and subsequently cooling the group of rods and brazing metal to cause the latter to solidify and unite the rods into a solid block.

10. The method of forming a die from a plurality of metallic rods of different lengths, the method consisting in the following step: assembling the rods in a group in close mutual engagement with each other with their lower ends in a plane and with their upper ends at the different levels to provide the upper surface of the group with a patterned contour, packing on the upper ends of the rods a brazing metal which melts at a temperature lower than the melting temperature of the rods and has a coefficient of expansion greater than the coefficient of expansion of the metal of which the rods are formed, heating the rods and brazing metal to melt the latter and enable it to flow down between the rods, and subsequently cooling the rods and brazing metal to solidify the latter and cause it upon cooling to unite the rods into a solid block and draw them toward each other.

11. The method of forming a die from a plurality of steel rods of different lengths, the method consisting in the following steps: assembling the rods in a group in close mutual engagement with each other with their lower ends in a plane and with their upper ends at different levels to provide the upper surface of the group with a patterned contour, placing copper over the upper ends of the rods, heating the rods and copper sufficiently to melt the latter without melting the rods to cause the copper to flow down between the rods, and subsequently cooling the rods and copper to cause the latter to solidify and unite the rods into a solid block.

12. The method of uniting a plurality of steel rods of uniform square cross section and of different lengths by a brazing metal to form a die, said method consisting in the following steps: assembling the rods in a group with their lower ends in a plane and with their upper ends at different levels to provide the upper surface of the group with a patterned contour and in sufficiently close relationship with each other to cause the brazing metal when molten to creep along the spaces between the rods due to capillary attraction, placing the brazing metal over the ends of the rods, heating the rods and brazing metal sufficiently to melt the latter without melting the rods to cause the molten brazing metal to flow into the spaces between the rods by capillary attraction, and subsequently cooling the rods and brazing metal while the rods are still in said close relationship to solidify the brazing metal and cause the latter upon cooling to unite the rods into a solid die block.

13. The method of making two die parts for cooperation with each other in which each part comprises a plurality of metal rods of uniform cross section and of different lengths united by a brazing metal, said method consisting in the following steps: assembling the rods for each part in a group with certain of their ends in a plane and with their opposite ends at different distances from the plane to provide the group with a contoured surface, causing a brazing molten metal to fill the spaces between the rods of each part and subsequently cooling the rods and brazing metal to cause the latter upon solidification to unite the rods in a solid die block, the rods for both of said parts having the same coefficinet of expansion and the brazing metal used for both of said parts having the same coefficient of expansion.

14. The method of forming two die parts for cooperation with each other from a plurality of rods of the same cross-sectional area but of different lengths, said method consisting in the following steps: arranging the rods in two groups each having the same number of rods, certain ends of the rods in each group lying in a plane corresponding to that group and the opposite ends of the rods in each group terminating at different distances from the corresponding plane to provide the group with a contoured surface, the two groups having equal numbers of rows of rods and the number of rods in each row being equal, brazing the two groups of rods to form two die blocks with a metal which has the same coefficient of expansion for both blocks, the rods all having the same coefficient of expansion, whereupon cooling of the two groups produces two die parts of substantially the same dimensions.

15. The method of uniting a plurality of metallic rods of uniform square cross section and of different lengths by a brazing metal to form a die, said method consisting in the following steps: grouping a plurality of rods of different lengths in an inclosure to which the brazing metal when molten will not adhere with certain ends of the rods in a plane and with the opposite ends at different distances from the plane to form a contoured surface, causing the brazing metal to melt and flow between said rods and adhere to the latter while said rods are heated to the melting temperature of the brazing metal, and subsequently cooling the rods and brazing metal in said inclosure and cause the brazing metal to unite the rods into a block which does not adhere to the sides of said inclosure.

WALTER H. WAKEFIELD.